United States Patent [19]

Schrage

[11] 4,131,147
[45] Dec. 26, 1978

[54] LENS CAP HOLDER FOR CAMERAS
[76] Inventor: Linus Schrage, 5201 S. Cornell, Chicago, Ill. 60615
[21] Appl. No.: 798,334
[22] Filed: May 19, 1977
[51] Int. Cl.² .............................................. B65D 85/38
[52] U.S. Cl. .................................. 150/52 J; 206/316; 224/5 V; 354/80
[58] Field of Search ....................... 150/52 J; 206/316; 224/5 V; 354/80

[56] References Cited
U.S. PATENT DOCUMENTS

| 2,323,053 | 6/1943 | Kupferschmid | 150/52 J |
| 2,547,492 | 4/1951 | Rohlik | 150/52 J |
| 3,072,166 | 1/1963 | Buchholtz et al. | 150/52 J |
| 3,083,826 | 4/1963 | Weinstein | 206/316 |
| 3,828,991 | 8/1974 | Moore | 206/316 |
| 3,924,786 | 12/1975 | Duquette | 224/5 V |

FOREIGN PATENT DOCUMENTS

| 963670 | 7/1950 | France | 150/52 J |
| 993638 | 11/1951 | France | 206/316 |

Primary Examiner—William Price
Assistant Examiner—Joseph Man-Fu Moy
Attorney, Agent, or Firm—Burmeister, York, Palmatier, Hamby & Jones

[57] ABSTRACT

A camera case or the body of a camera is provided with a lens cap holding mount secured to one wall thereof and having lens cap retaining means corresponding to the lens cap retaining arrangement of the lens on the camera. When not in use on the lens, the lens cap may be placed on the lens cap holding mount.

6 Claims, 6 Drawing Figures

U.S. Patent  Dec. 26, 1978  4,131,147
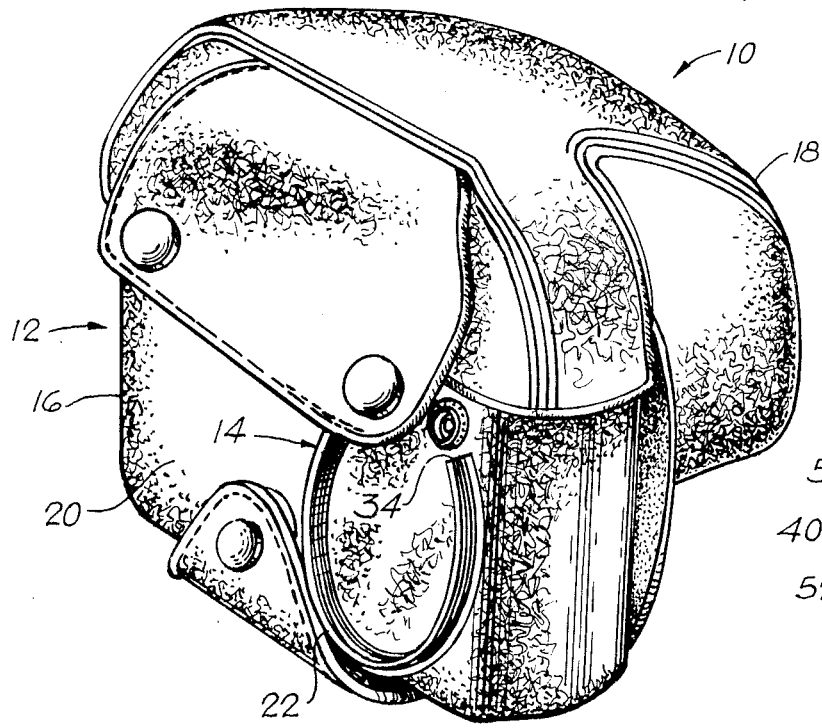
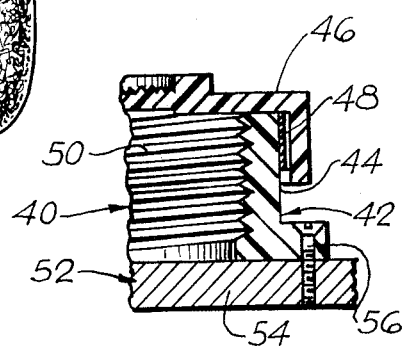
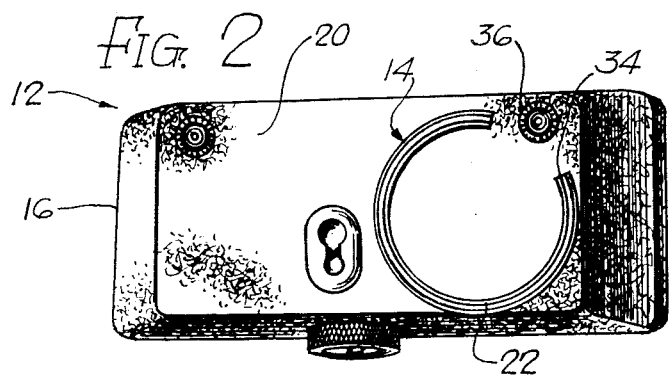
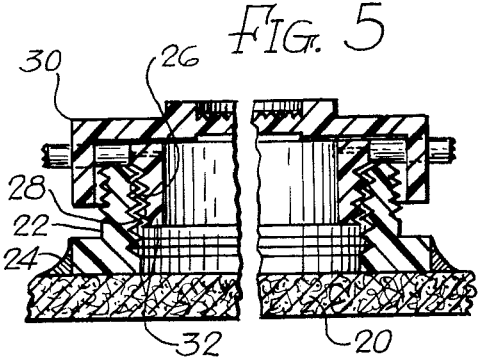
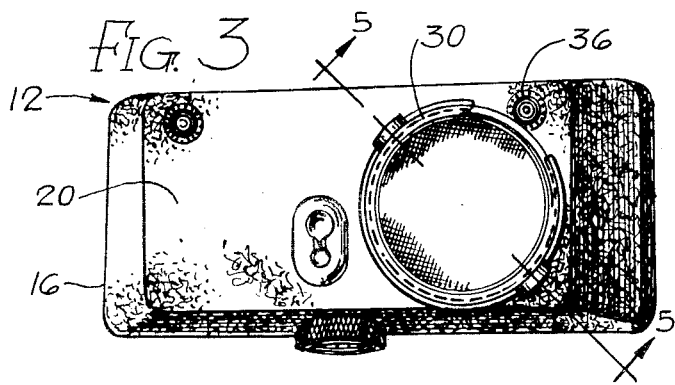
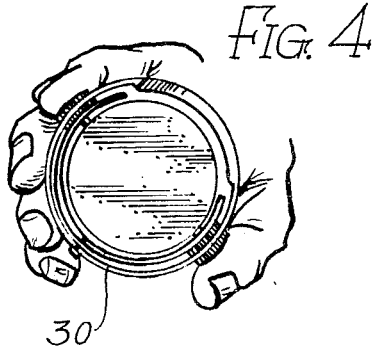

LENS CAP HOLDER FOR CAMERAS

This invention relates to a device for holding a lens cap, when the cap is not in use on the lens of the camera for which the cap is intended.

One object of the present invention is to provide a device for holding a lens cap, when not in use, so that the cap will be protected gainst loss.

A further object is to provide such a device which holds the lens cap so that it is conveniently and immediately accessible, whereby the lens cap can be returned to the lens very easily and in a matter of seconds.

In accordance with the present invention, these objects are achieved by providing a lens cap holding mount secured to a camera case, preferably to the rear wall thereof, or to the body of the camera. The lens cap mount includes lens cap retaining means corresponding to the lens cap retaining arrangement of the camera lens. When the lens cap is removed from the lens, the cap may be placed very conveniently on the lens cap holding mount. Thus, the lens cap will be protected from loss and will be instantly accessible so that the lens cap can be returned to the lens in a matter of seconds.

The lens cap mount may include lens cap retaining means in the form of screw threads, bayonet fastening elements, or a ring on which the lens cap is friction-fitted, in accordance with the lens cap retaining arrangement of the camera lens.

Further objects, advantages and features of the present invention will appear from the following description, taken with the accompanying drawings, in which:

FIG. 1 is a perspective view of a lens cap holding device to be described as an illustrative embodiment of the present invention, such device comprising a camera case having a lens cap mount thereon.

FIG. 2 is a rear view of the camera case, without the lens cap.

FIG. 3 is a rear view of the camera case, with the lens cap in place on the lens cap mount.

FIG. 4 is a view showing the rear side of the lens cap.

FIG. 5 is a fragmentary enlarged section, taken generally along the line 5—5 in FIG. 3, through the lens cap mount and the lens cap.

FIG. 6 is a fragmentary enlarged section, corresponding to a portion of FIG. 5, but showing a modified construction.

As just indicated, FIG. 1 illustrates a lens cap holder 10, comprising a camera case 12 having a lens cap mount 14 thereon. The camera case 12 is adapted to hold a particular camera, which may be of any type, make and model. The illustrated case 12 is of the ever-ready type, comprising a body component 16, adapted to receive the body of the camera, and a removable front cover 18, adapted to enclose the lens of the camera, when not in use.

The lens cap mount 14 is preferably secured to or formed on the body component 16 of the camera case 12. In this case, the body component 16 has a rear wall 20 to which the lens cap mount 14 is secured.

The camera case 12 may be made of leather, plastic or some other suitable material. The lens cap mount 14 may be made of plastic, metal or some other suitable material.

As illustrated, the lens cap mount 14 comprises a ring 22 which is suitably secured to the rear wall 20 of the camera case, as, for example, by means of a suitable adhesive 24, or suitable fasteners, such as screws, rivets, pins, or the like. The ring 22 is provided with lens cap retaining means 26, preferably corresponding to the lens cap retaining arrangement on the camera for which the case 12 is intended. As illustrated in FIG. 5, the ring 22 has lens cap retaining means 26 in the form of internal screw threads, adapted to mate with external screw threads 28 on a lens cap 30. In this case, the external screw threads 28 are formed on a bushing or ring 32, securely mounted in the lens cap 30.

As shown in FIGS. 1 and 2, a portion of the lens cap mount 14 is cut away to form a gap 34, which affords clearance for a snap fastener 36, which is employed to secure the front cover 18 of the case to the body component 16.

The lens cap 30 is intended for use on a camera having a filter mount with internal screw threads, at the front end of the lens assembly for the camera. The internally threaded filter mount may be employed to hold a filter or a lens cap.

It will be understood that the lens cap mount 14 may have any other suitable type of lens cap retaining means, corresponding to the arrangement employed on the camera for which the camera case is intended. For example, such lens cap retaining means may take the form of bayonet type fastening elements, or a ring on which the lens cap is adapted to be friction-fitted.

FIG. 6 shows a modified lens cap mount 40 comprising a ring 42 having an external cylindrical surface 44 adapted to receive a lens cap 46 with a friction fit. As shown, the lens cap 46 is provided with an internal spring member 48 which presses against the cylindrical surface 44 to produce the friction fit. The ring 42 also has internal screw threads 50 for receiving and retaining an externally threaded lens cap, such as the lens cap 30 of FIG. 5.

If desired, the lens cap mount 40 may be secured to the rear wall or any other suitable portion of a camera case. However, FIG. 6 illustrates the lens cap mount 40 as being secured to a camera body 52, preferably the rear wall 54 thereof. Any suitable fastening means, such as the illustrated screws 56, may be employed to secure the lens cap mount 40 to the camera body 52. The lens cap mount 40 may be characterized as a dummy mount to hold the lens cap 46 when it is not in place on the lens assembly of the camera.

It will be understood that either lens cap mount 14 or 40 may be secured to or formed with any desired portion on the outside or the inside of the camera case 12 of FIG. 1, or on the camera body 52 of FIG. 6. The lens cap mount 14 or 40 provides lens cap retaining means adapted to mate with the lens cap. The camera case or the camera body, whichever supports the lens cap mount, may be characterized as camera enclosure means.

In use, the lens cap 30 or 46 is employed to protect the lens of the camera. When the lens cap 30 or 46 is removed from the lens, the lens cap 30 or 46 may be placed on the lens cap holding mount 14 or 40 on the camera case 12 or the camera body 52. This may be done very quickly and conveniently, so that the lens cap will be protected against loss. The lens cap 30 is screwed into the lens cap mount 14, while the lens cap 46 is friction-fitted around the lens cap mount 40.

When the lens cap 30 or 46 is on the lens cap mount 14 or 40, the lens cap is instantly accessible so that it may be returned very quickly and conveniently to the camera lens. The instant accessibility of the lens cap makes it unnecessary for the user to fumble through pockets or a bag to locate the lens cap.

I claim:

1. A device for preventing the loss of a lens cap for a camera, said device comprising a camera case of the ever-ready type having a body component and a front cover removably mounted thereon, said body component of said case having a rear wall, a generally circular lens cap having a ring-shaped mounting member with external screw threads thereon, and a generally ring-shaped lens cap mount secured to the rear side of said rear wall on said body component of said camera case and projecting rearwardly from said rear wall, said lens cap mount having a generally cylindrical opening with internal screw threads therein disengageably mating with said external screw threads on said lens cap for receiving and retaining the lens cap when not in use on the camera, said lens cap mount being exposed on said rear wall and being fully and directly accessible for the direct and immediate mounting and removal of said lens cap on and from said lens cap mount.

2. A device for preventing the loss of a lens cap for a camera, said device comprising a camera case of the ever-ready type having a body component and a front cover removably mounted thereon, said body component of said case having a rear wall, a generally circular lens cap having a ring-shaped rearwardly projecting generally cylindrical mounting flange thereon, and a generally ring-shaped lens cap mount secured to the rear side of said rear wall on said body component of said camera case and projecting rearwardly from said rear wall, said lens cap mount having a generally cylindrical retaining flange disengageably mating with said mounting flange on said lens cap for retaining the lens cap when not in use on the camera, said flanges on said lens cap and said lens cap mount mating endwise, one within the other, said lens cap mount being exposed on said rear wall and being fully and directly accessible for the direct and immediate mounting and removal of said lens cap on and from said lens cap mount.

3. A device for preventing the loss of a lens cap for a camera, said device comprising a camera case of the every-ready type having a body component and a front cover removably mounted thereon, said body component of said case having a rear wall, a generally circular lens cap having a ring-shaped rearwardly projecting generally cylindrical mounting flange thereon, and a generally ring-shaped lens cap mount secured to the rear side of said rear wall on said body component of said camera case and projecting rearwardly from said rear wall, said lens cap mount having a generally cylindrical retaining flange disengageably mating with said mounting flange on said lens cap for retaining the lens cap when not in use on the camera, said flanges on said lens cap and said lens cap mount mating endwise, one within the other, said lens cap mount being exposed on said rear wall and being fully and directly accessible for the direct and immediate mounting and removal of said lens cap on and from said lens cap mount, said flanges on said lens cap and said lens cap mount including disengageably mating internal and external generally cylindrical surfaces with a friction fit therebetween for retaining said lens cap on said lens cap mount.

4. A device for preventing the loss of a camera lens cap, said device comprising a camera enclosure having a rear wall, a generally circular lens cap having a ring-shaped mounting member with external screw threads thereon, and a generally ring-shaped lens cap mount secured to the rear side of said rear wall and projecting rearwardly therefrom, said lens cap mount having a generally cylindrical opening with internal screw threads therein disengageably mating with said external screw threads on said lens cap for receiving and retaining the lens cap when not in use on the camera, said lens cap mount being exposed on said rear wall and being fully and directly accessible for the direct and immediate mounting and removal of said lens cap on and from said lens cap mount.

5. A device for preventing the loss of a camera lens cap, said device comprising a camera enclosure having a rear wall, a generally circular lens cap having a ring-shaped rearwardly projecting generally cylindrical mounting flange thereon, and a generally ring-shaped lens cap mount secured to the rear side of said rear wall and projecting rearwardly therefrom, said lens cap mount having a generally cylindrical retaining flange disengageably mating with said mounting flange on said lens cap for retaining the lens cap when not in use on the camera, said flanges on said lens cap and said lens cap mount mating endwise one within the other, said lens cap mount being exposed on said rear wall and being fully and directly accessible for the direct and immediate mounting and removal of said lens cap on and from said lens cap mount.

6. A device for preventing the loss of a camera lens cap, said device comprising a camera enclosure having a rear wall, a generally circular lens cap having a ring-shaped rearwardly projecting generally cylindrical mounting flange thereon, and a generally ring-shaped lens cap mount secured to the rear side of said rear wall and projecting rearwardly therefrom, said lens cap mount having a generally cylindrical retaining flange disengageably mating with said mounting flange on said lens cap for retaining the lens cap when not in use on the camera, said flanges on said lens cap and said lens cap mount mating endwise one within the other, said lens cap mount being exposed on said rear wall and being fully and directly accessible for the direct and immediate mounting and removal of said lens cap on and from said lens cap mount, said flanges on said lens cap and said lens cap mount including disengageably mating internal and external generally cylindrical surfaces with a friction fit therebetween for retaining said lens cap on said lens cap mount.

* * * * *